US008297055B2

(12) United States Patent
Ackman

(10) Patent No.: US 8,297,055 B2
(45) Date of Patent: Oct. 30, 2012

(54) WATER MOTOR

(76) Inventor: Terry Edward Ackman, Jefferson Hills, PA (US)

( * ) Notice: Subject to any disclaimer, the term of this patent is extended or adjusted under 35 U.S.C. 154(b) by 345 days.

(21) Appl. No.: 12/804,618

(22) Filed: Jul. 26, 2010

(65) Prior Publication Data

US 2012/0017589 A1    Jan. 26, 2012

(51) Int. Cl.
*F03B 17/06* (2006.01)
*F04B 17/00* (2006.01)

(52) U.S. Cl. .......................................... 60/640; 417/329

(58) Field of Classification Search ............ 60/640–639, 60/638; 417/329; 177/94–97
See application file for complete search history.

(56) References Cited

U.S. PATENT DOCUMENTS

| | | | | |
|---|---|---|---|---|
| 474,238 A | * | 5/1892 | Gardner | 60/640 |
| 601,906 A | * | 4/1898 | Rudasill | 60/640 |
| 1,459,645 A | * | 6/1923 | Wilson | 60/640 |
| 1,531,750 A | | 3/1925 | Krueger | |
| 2,499,715 A | | 3/1950 | Blevins | |
| 2,583,528 A | * | 1/1952 | Habsch | 417/329 |
| 5,970,713 A | * | 10/1999 | Iorio | 60/640 |

* cited by examiner

*Primary Examiner* — Fenn Mathew
*Assistant Examiner* — Ngoc T Nguyen
(74) *Attorney, Agent, or Firm* — Carothers & Carothers

(57) ABSTRACT

A water motor which includes a tubular tipping lever arm open on both ends and a central water fill port, and a central fulcrum pivotally supporting the lever arm for seesaw tipping thereabout. Temporary containment vessels Containers are positioned under each open end of the lever arm to receive water flowing from a respective one of the open ends of the lever arm. Water is drained from each vessel when a respective one of the lever arm ends is in an up position. A float is positioned in each of the containers and each float is provided with an upwardly extending rigid lifting vertical rod of predetermined length for engaging respective of the opposed lever arm ends for thereby cyclically reversing the seesaw tipping of the tipping lever arm and providing also resultant draining of a respective of the containers with the buoyancy force of the floats.

6 Claims, 4 Drawing Sheets

WATER MOTOR

FIELD OF THE INVENTION

The present invention pertains to water motors; more specifically, devices that derive kinetic energy from the potential energy of water weight as a result of gravity.

BACKGROUND OF THE INVENTION

It is an object of the present invention to provide an efficient and effective water motor wherein the derived kinetic energy can be utilized to generate electricity, power a pump, or drive other operations, such as a compressor, utilizing low head. For example, water falling from a height of seven feet, more or less. The present invention has the objective to take advantage of falling water that could be accessed from a large variety of sources, such as: natural streams, discharges from flood control structures (e.g., dams, locks, levies), storm runoff, snow melt, mine effluent, power plant cooling water, seasonal irrigation discharges, and other infrastructures, such as, water and waste water lines.

Such a water motor needs to be efficient, small in size and lightweight so that it can be located locally and easily in any of the aforementioned situations.

SUMMARY OF THE INVENTION

The water motor of the present invention is capable of efficiently and effectively of taking advantage of such low head water flow supplies utilizing a compact mechanism which is more efficient than the water motors of the prior art.

The water motor of the present invention comprises a tubular tipping lever arm having opposed open ends and a central water fill port positioned above a central fulcrum pivotally supporting the lever arm for seesaw tipping about the central fulcrum. A container is positioned under each open end of the lever arm to receive water flowing from a respective one of the open ends of the lever arm, and a drain valve is provided in each container for respectively draining water from the containers. Flexible pull lines of predetermined length are respectively connected between the lever arm ends and the drain valves for opening the drain valves when a respective one of the lever arm ends is in an up position. A float is positioned in each of the containers and each float is provided with an upwardly extending rigid lifting rod of predetermined length for engaging a respective one of the opposed lever arm ends for thereby cyclically reversing the seesaw tipping of the lever arm and also thereby providing resultant draining of a respective of one of the containers with the buoyancy force of the floats. This is the water motor of the present invention in its most basic form.

In a more efficient form, the water motor of the present invention is constructed whereby the containers are mounted to opposite ends of a work lever arm that has a central fulcrum supporting the work lever arm for seesaw rocking about the fulcrum point. A workload is connected to the rocking work lever arm, such as, a turning shaft or reciprocating pistons, for performing work generated from the rocking work lever.

In order to make this combination more effective and more efficient, a pair of closed water reservoirs are respectively secured to the containers with a conduit interconnecting the reservoirs for permitting flow transfer of water from one reservoir to the other in a cyclic manner as the work lever arm rocks. These reservoirs may be mounted respectively on the top of the containers and shaped in the form of a collar which is secured to the upward open lip of the container.

In situations where the tubular tipping lever arm must be shorter than desired, the open end of the tubular lever arm may be provided with dam walls in order to provide a small amount of water reservoir built up in each end of the tipping lever arm.

BRIEF DESCRIPTION OF THE DRAWINGS

Other objects and advantages appear hereinafter in the following description and claims. The accompanying drawings show, for the purpose of exemplification, without limiting the scope of the invention or appended claims, certain practical embodiments of the present invention wherein:

DETAILED DESCRIPTION OF THE PREFERRED EMBODIMENT

Figure 1:
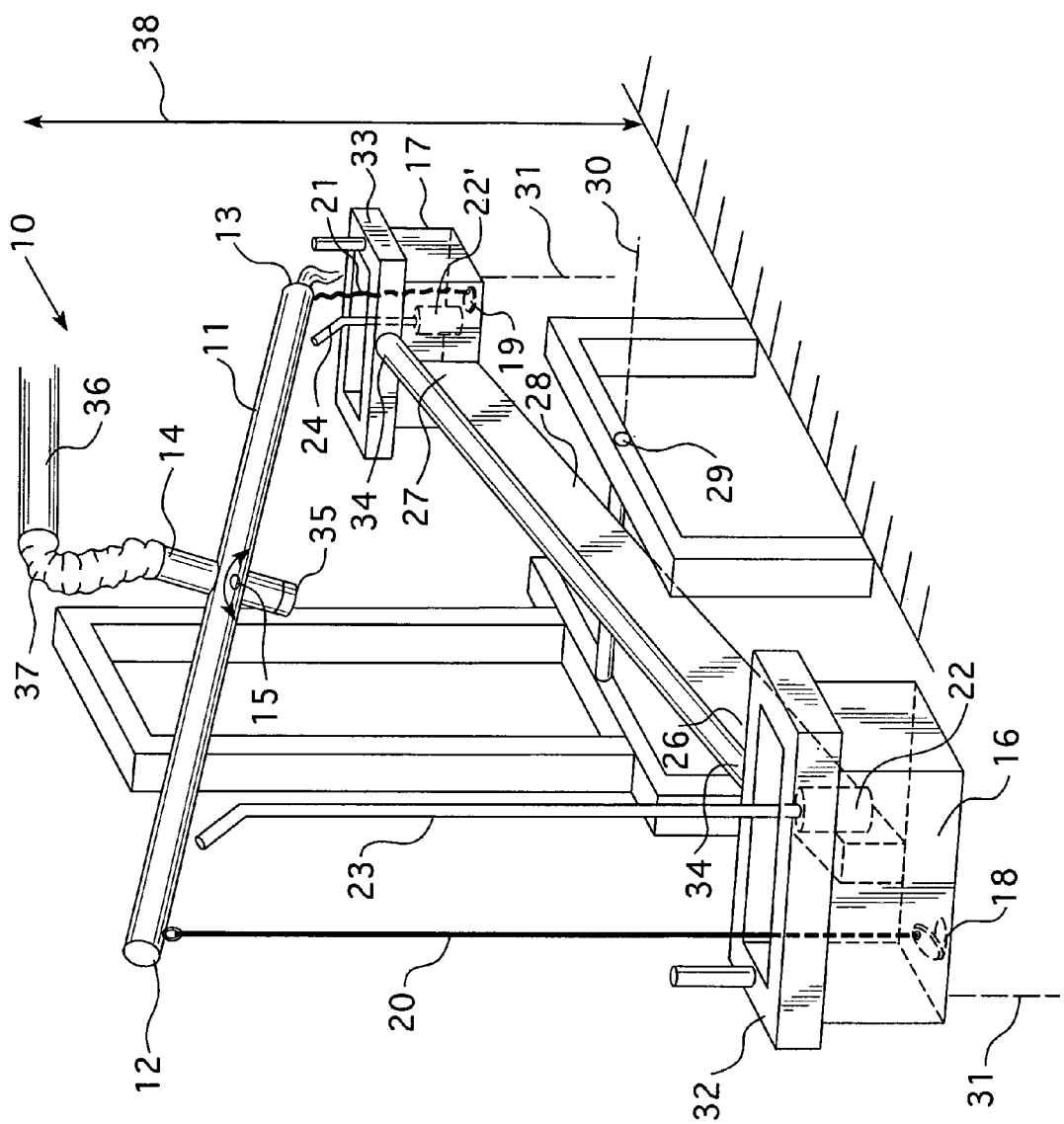
FIG. 1 is a perspective schematic drawing illustrating one embodiment of the water motor of the present invention.

Referring to FIG. 1, the water motor 10 of the present invention is comprised of a tubular tipping lever arm 11 having opposed ends 12 and 13, a central water fill port 14 and a central fulcrum 15 pivotally supporting lever arm 11 for seesaw tipping thereabout. Containers 16 and 17 are respectively positioned under each open end 12 and 13 of lever arm 11 to receive water flowing from a respective one of the open ends 12 or 13.

Each container is provided with a float drain valve 18 and 19 respectively for respectively draining water from container 16 or container 17. Flexible pull lines 20 and 21 are each of a predetermined length and respectively connected between lever arm ends 12 and 13 to drain valves 18 and 19 for opening the drain valves when a corresponding one of the lever arm ends 12 and 13 is in an up position. In the figure, lever arm 12 is in the up position and drain valve 18 is therefore open, draining container 16.

A float 22 and 22' are respectively positioned in containers 16 and 17. Each float is secured to an upwardly protruding or extending rigid lifting rod 23 or 24 respectively of predetermined length for engaging a respective one of the opposed lever arm ends 12 and 13 for thereby cyclically reversing the seesaw tipping of lever arm 11 and also causing the resultant draining of a respective one of the containers 16 or 17 with the respective buoyancy force of either float 22 or float 22'.

The containers 16 and 17 are respectively mounted to opposite ends 26 and 27 of work lever arm 28, which has a central fulcrum 29 which is a pivot point supporting work lever arm 28 for seesaw rocking thereabout. A work load, such as oscillating work shaft 30, or vertically disposed work pistons 31 shown in dashed outline, are connected to rocking work lever arm 28 for performing work generated from the rocking motion of work lever 28.

A pair of closed water reservoirs 32 and 33 are respectively secured to containers 16 and 17 with a conduit 34 connecting these reservoirs 32 and 33 for permitting flow transfer of water from one reservoir to the other in a cyclic manner as work lever arm 28 seesaws or rocks. These reservoirs 32 and 33 are provided in the form of collar shaped reservoirs which are mounted respectively on the top of containers 16 and 17.

Tipping lever arm 11 is also provided with a downwardly depending reservoir 35 positioned under the central fulcrum 15 of lever arm 11 which serves as a counterweight.

Flowing water from a water source is directed through pipe 36 and flexible hose 37 into central water fill port 14 of tipping lever arm 11 at the elevation indicated by the head of elevation change arrow 38. Although the tipping lever arm 11 is here shown as tubular piping, it may be constructed instead of flumes. Accordingly, when the term "tubular" is used, it is intended to indicate any suitable trough mechanism for flowing the water.

Figure 2:
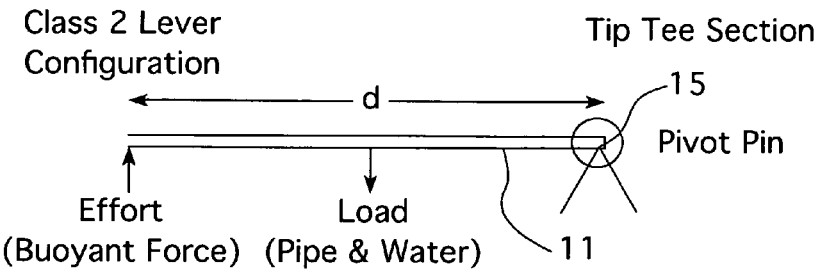
FIG. 2 is a schematic diagram illustrating the forces applied to the tipping lever arm of the water motor shown in FIG. 1 as a class 2 lever system.
Figure 3:
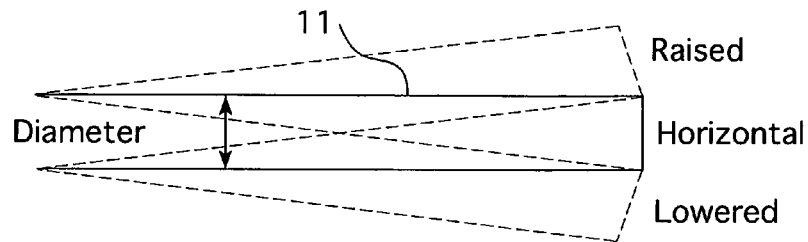
FIG. 3 is a schematic diagram illustrating the minimal tipping distance required by the buoyant force to be approximately equivalent to the pipe diameter.

The tipping lever arm 11 can be defined as a class 2 lever system as depicted in FIG. 2. It contains two balanced horizontal arms with outlets 12 and 13 on each end, an inlet pipe at the water fill port 14 and a counterbalance chamber provided by the reservoir 35. Without the intervention of the buoyant force of either float 22 or 22' applied by the raised float through the respective lifting rod 23 or 24, tipping lever arm 11 would discharge water in two directions simultaneously at ends 12 and 13 due to the balanced symmetry of the design. However, if lever arm 11 is tipped a vertical distance of at least the pipe diameter to one side or the other, the total flow will discharge from the lower end, given an appropriate design of pipe diameter and flow rate as schematically illustrated in FIGS. 3 and 4.

Figure 4:
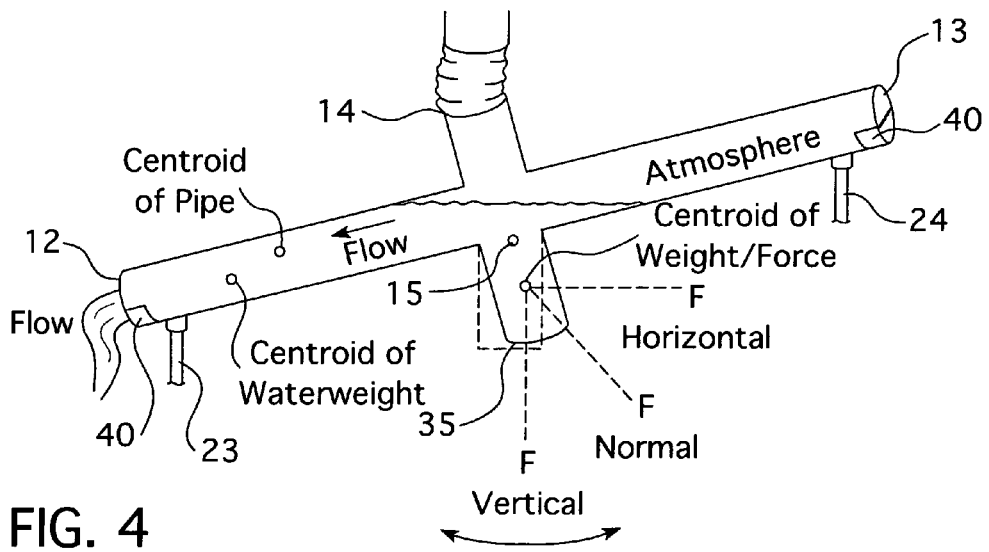
FIG. 4 is a schematic illustration illustrating the forces within the tipping lever arm of the water motor shown in FIG. 1 that must be overcome by the buoyant force.

The tubular lever arm 11 of FIG. 4 is provided at its opposite ends 12 and 13 respectively with bottom half caps or dam walls 40. Dam walls 40 are not required in all situations, but are effective in situations where a shorter lever arm 11 must be employed, thereby providing the accumulation of more water in each respective end of lever arm 11.

Buoyancy of the floats 22 and 22' is created in the temporary water storage containers 16 and 17. This buoyant force created by the temporary containment is used to act internally within the system to redirect flow or raise the lowered arm of the lever arm 11, in FIG. 1, end 13 being the lowered end, and simultaneously activating or raising the corresponding valve 18 or 19 in the bottom of the respective container 16 or 17 to discharge the contained water.

The flow from the lever arm 11 is discharged into and temporarily stored in and subsequently released from a respective underlying one of the containers 16 or 17. Low density floats 22 and 22', which may be simply air filled containers, rise and fall as the respective containers 16 and 17 fill and drain. The buoyant force created as the container 16 or 17 fill with water is mechanically and vertically directed to raise the lowered arm of the lever arm 11, and thus redirect flow to the opposing empty container 16 or 17.

As the respective float 22 or 22' raises the corresponding end 12 or 13 of lever arm 11, the flow direction of lever arm 11 is reversed, the lowered end 12 or 13 is raised and the flexible pull line 20 or 21 is raised and opens the corresponding float drain valve 18 or 19 and allows the stored water to discharge as indicated at the bottom of container 16 in FIG. 1. Thus, this action simultaneously allows the weight or load from the lowered side of work lever 28 to drain, redirect flow of water, and begins to fill the empty raised container on the opposite side of fulcrum 29. The float drain valve 18 or 19 remains in the raised position until the raised arm 12 or 13 of lever arm 11 is lowered by the same process, beginning on the opposite side of the lever arm 11. This closes the float drain valve 18 or 19 as flow is once again redirected back to the emptied container 16 or 17. It is through this ability to transfer and discharge fluid between independent storage containers 16 and 17, coupled with the oscillating elevation change of the lower work lever system that permits forces of water weight to be generated for conversion into either work or power through mechanical connections 30 or 31.

The counterbalance reservoir 35 is used as a means to reduce the buoyant force needed to raise the lowered, water filled lever arm 11, and simultaneously, create a small surge when the half cap or end dam walls 40 are used to aid in lifting the float drain valve 18 or 19 that has a column of water generating pressure on it. The buoyant force needed to raise the lowered arm is offset by the vertical component force or torque of the tilted counterbalance reservoir 35, and a class 2 lever configuration provides a mechanical advantage that is exerted by the buoyant force on the discharge end of the lever arm 11. The magnitude of the vertical component of the counterweight balance force supplied by counterweight reservoir 35 must be less than the force or weight of the flowing water existing in the lowered lever arm 11. Otherwise, the lever arm 11 would not be able to remain tilted after the respective one of the floats 22 or 22' is lowered by the draining water, and would no longer exert a vertical force.

The tipping lever arm 11 operates as a lever system or seesaw, such that the central pivot pin serves as the fulcrum 15 and the alternating buoyant forces created by the floats 22 and 22' raises and lowers the floats together with their respective lifting rods 23 and 24, which in turn raises and lowers the ends 12 and 13 of the tipping arm lever 11. The amount of buoyant force generated and distance of vertical travel by the temporary storage or load contained in the containers 16 and 17 is a function of the container's volume and geometry, such that the magnitude of buoyant force on a completely or partially submerged object, such as the float 22 or 22', always equals the weight or volume of the fluid displaced by the float. Consequently, the float 22 or 22' used to raise the lowered tipping lever arm 11 must be of adequate size and displacement to generate a force sufficient to raise the tipping lever arm 11, submerged float drain valve 18 or 19 with its respective flexible chain or pull line 20 or 21, and depending upon design, any other frictional sources, such as pivot pins or weight, such as a shaft or a rod that may be attached to a float for the purpose of raising the lever arm 11.

Figure 5:
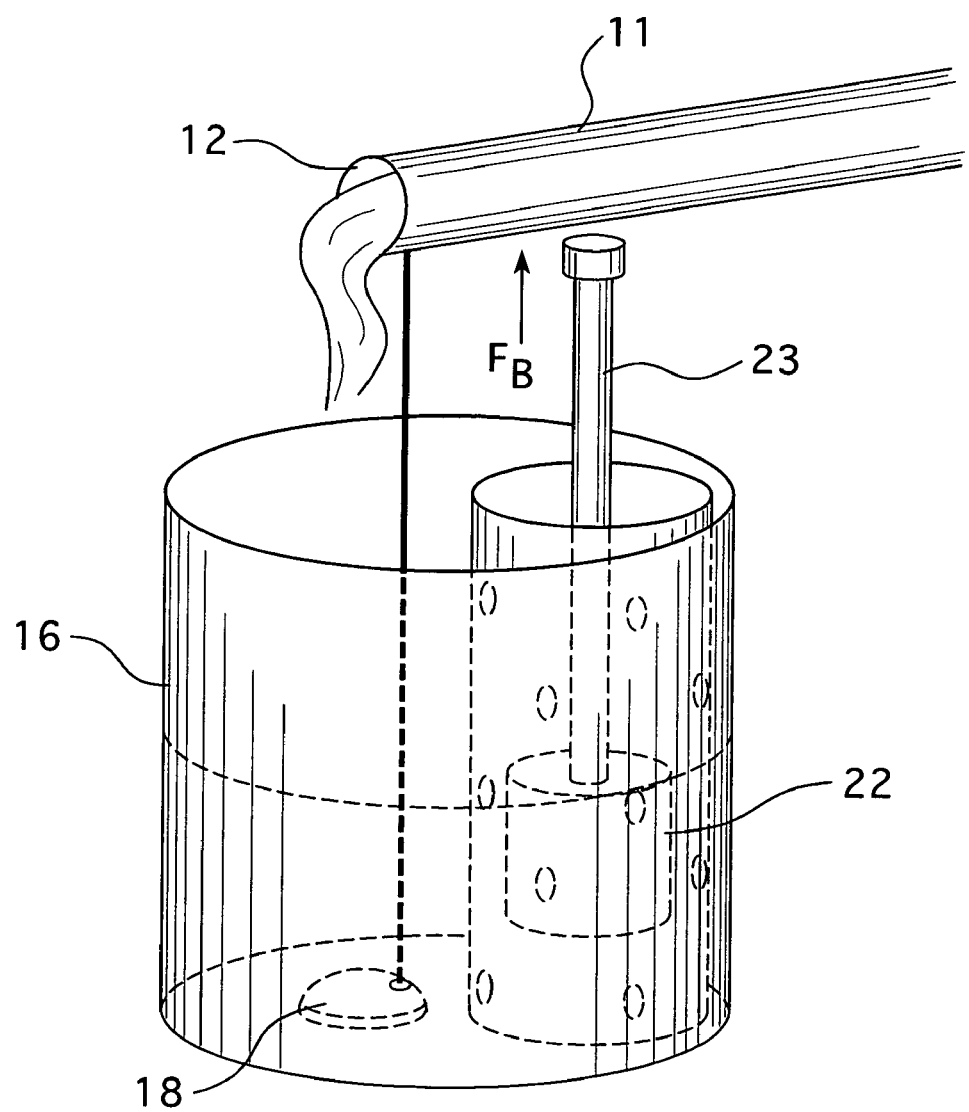
FIG. 5 is a schematic drawing illustrating one of the containers for the water motor of the present invention illustrated as half full.

Furthermore, the buoyancy of the float 22 or 22' allows for flexibility in terms of how much water (or weight) is stored in the respective container 16 or 17. The geometry and volume of the containers 16 and 17 dictates how much water can be stored, and thus, the magnitude of the buoyant force that can be generated and the distance that the float will travel upwards. In this regard, see FIG. 5.

The tipping lever arm 11 can be viewed as a class 2 lever system as represented in FIG. 2, which unlike a seesaw with effort and resistant forces working on opposite sides of the fulcrum (class 1 lever), the effort and resistance forces are located on the lowered side of the fulcrum 15. A common example of such a class 2 lever configuration is a wheelbarrow. An analogy would be the buoyant force lifting on the handles of the wheelbarrow and the load is located between the handle and fulcrum (pivot pin or wheel axil). However, it is important to note that the lever arm 11 is raised and flow is redirected to the opposite side during this transfer of flow direction and acts as a class 1 lever, experiencing effort and resistance loads on both sides.

Water delivered via pipe, flume, gravity or pressure to the tipping lever arm 11 will typically enter the top fill port 14 of the lever arm 11, which is exposed to atmosphere. Fluid flow passes through the lever arm 11 and exits either end 12 or 13 into a raised container 16 or 17 mounted on work lever arm 28. Thus, the tipping lever arm discharge end 12 or 13 must be located at a height above the raised container 16 or 17 in order to provide clearance for the seesaw operation. In this regard, see FIG. 6. The weight of the lower container 16 or 17 (which is simultaneously draining at a rate equal to or greater than the rate entering the raised container 16 or 17) maintains the raised container position until the balance of weight shifts, and ultimately all the lowered container water weight contained in 32 or 33 is raised by the equivalent upper container load (16 or 17) and it transfers the combined weight load to the opposite side. The discharged flow is returned to its source, which can be done by a variety of means of one type or another without generating pollution (chemical, thermal, or atmospheric).

The distance the levers move in both the tipping lever arm 11 and the work lever 28 is important. In the case of the tipping lever arm, vertical distance is kept to a minimum and is related to the pipe diameter (see FIG. 2), and does not directly produce output. However, increased vertical distance in the production or work lever system does decrease output and should be maximized.

Figure 6:
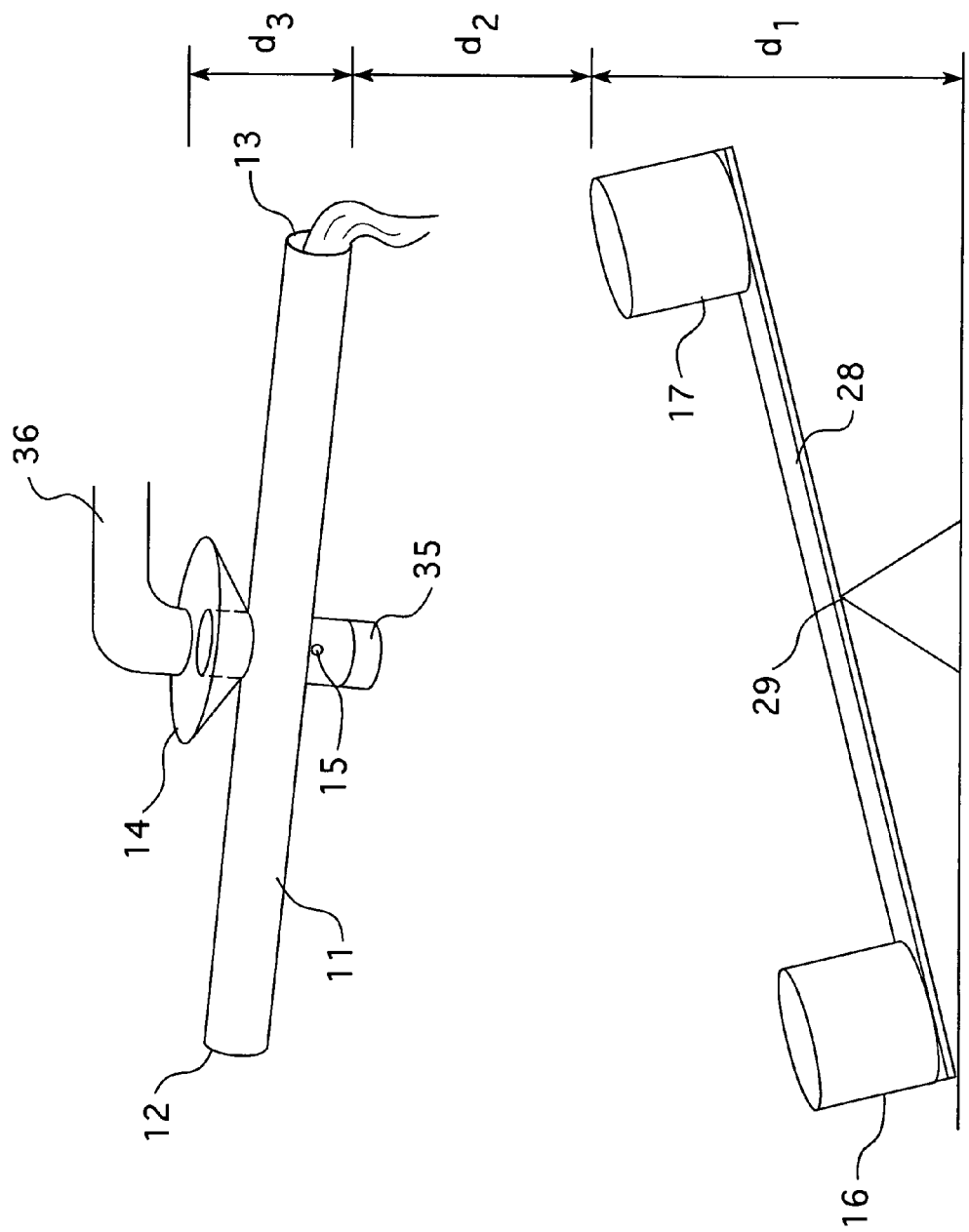
FIG. 6 is a schematic diagram illustrating the water motor of the present invention as utilized in a low water head elevation.

The elevation or head required for operation of the water motor 10 (see FIG. 6) is defined as the sum of (d1), the height of the raised work lever arm 28 with temporary storage container 16 or 17 attached, which in turn is dependent on the height of the fulcrum 29, (d2) the vertical distance that the end of tipping lever arm 11 travels, starting from the horizontal position, and (d3) the height of the vertical flow inlet of the tipping lever arm 11 (FIG. 6). The tipping or vertical movement distance is minimal, yet facilitates gravity flow. This approach enhances or maximizes available travel distance in the lower portion work lever system incorporating the work lever arm 28. Consequently the angle between the horizontal position, the fulcrum 15 of the tipping lever arm 11 and lowered position is shallow or small. Due to gravity flow, the approximate distance required for the tipping lever arm 11 to travel, is measured from the horizontal position, and to facilitate directional flow, is nearly equivalent to the diameter of the pipe of which the tipping lever arm 11 is constructed. The configuration of float 22 or 22' and corresponding lifting rod 23 or 24 can also serve as vertical braces or stops to prevent excessive downward travel.

The construction of the tipping lever arm device is done in such a manner as to minimize friction losses and weight. Typical construction would include the use of lightweight polymer-based materials. The diameter of the vertical inlet pipe at inlet port 14 is based on the flow rate and piping system that is delivering flow to the port 14 of the tipping lever arm 11. The tipping lever arm 11 rocks or cycles back and forth in a vertical plane; consequently, the inlet piping 37 at port 14 needs to be flexible enough as indicated to receive the discharge from the water source. Several options exist for accomplishing this movement: flexible hose 37 is attached to the vertical inlet pipe port 14 of the tipping lever arm 11 and the source piping 36, or alternatively, a wide funnel-like device can be utilized for the inlet port 14 as illustrated in FIG. 6.

The fulcrum 15 for the tipping lever arm 11 can be a simple bolt or a lubricated steel bearing type device. The pivot pin is a source of friction and resistance to the buoyant upward force acting on the arm end 12 or 13 of the tipping lever arm 11 by float device 22 or 22'. Furthermore, the pivot pin provides structural support for the device and can be attached to an independent integrated frame structure that supports both the tipping lever arm and the work lever arm 28.

At the tipping tee arm 11, the use of buoyant force of floats 22 and 22' are independent of the production lever 28. Also, with the addition of tracking time and a mechanical counting device (lever actuated, not shown) with the motion of the tipping arm 11, the device shown in the figures can serve as a flow meter since the volume and the float displacement of each container 16 and 17 is known.

The work lever 28, similar to a seesaw, achieves reoccurring elevation differences or head, based on the height of the fulcrum 29 from a fixed point or elevation. The lever system is modified to include fluid (permanent or temporary) containers 16, 17, 32 and 33 as integral compliments of the lever system. Thus, it is the raising and lowering of the fluid containers 16, 17, 32 and 33 coupled with design filling and draining (alternating weight loads between opposing position) that allows the work lever 28 to create forces that can be converted into useful work or energy through mechanical connections, such as 30 or 31.

The footprint of the work lever system incorporating the work lever 28 is relatively small with no atmospheric emissions. The geometry of the system, including the containers 16, 17, 32 and 33, the work lever 28 and the tipping lever arm 11, is flexible and can be designed to minimize elevation requirements and maximize output. Consequently, there are many different design configurations of the containers 16, 17, 32 and 33 and of the tipping lever arm that can be integrated on the lower working lever arm 28.

The fulcrum height, or head, is half of the total distance that the end of the work lever 28 will travel. For example, a 4 foot fulcrum height for fulcrum 29 is equivalent to an 8 foot travel distance. Alternatively stated, as one end of the work lever arm 28 is lowered 4 feet to the ground, the opposing lever end rises 4 additional feet (a total of 8 feet) off the ground. Design configurations include fulcrum height and relative production or work lever length. The fulcrum 29 and the work lever arm 28 require adequate load bearing strength. It is also possible to increase lever or beam strength in a number of ways, which can include the use of different materials and/or using bridge building techniques, such as trusses and suspension cables. For example, a pole can be located on the center of the work lever arm 28 above fulcrum 29 and connected to anchor cables fastened to the ends of work lever arm 28.

The amount of work produced can be increased by increasing the force (f) or volume (weight capacity) of the temporary load of containers 16 and 17 that is falling with stored water 32 and 33. The maximum volume or weight capacity of 32 and 33 is a direct function of the volume or weight capacity of 16 and 17. For example, the weight of water in a circular containment vessel or container can be increased exponentially by increasing its diameter, without increasing vessel height. The vessel height is directly related to the tipping lever arm 11. The tipping lever arm 11 in a lowered positioned must be higher than the height of the raised container 16 or 17, otherwise temporary storage and drainage of water would not be feasible.

The scaling or sizing of the tipping lever arm 11 and work lever arm 28 is directly related to the desired outcome, such as generating power or work (e.g., kWh or ft-lb/f, respectively), frequency of output, and the incoming flow rate at port 14. As an example, if 55 gallon drums (approximately 459 pounds force) were used as the opposing containers 16 and 17 and a continuous flow rate of 55 gallons per minute (gpm) was entering the system, a single cycle (traversing one foot of head) would be completed every minute. However, if the volume of the containers 16 and 17 were each increased 10 times (550 gallons) at the same flow rate (55 gpm) at the same one foot head, a cycle would take ten minutes, but a much greater force (potential energy only—not including mechanical advantage or system losses) of approximately 4,590 pounds of force (f) would be generated. Likewise, by increasing the volume of containers 16 and 17 100 times (5,500 gallons) an even larger force of about 45,900 lbs of potential energy, which if lowered only one foot would generate 45,900 ft-lbs (or 1.4 horsepower) ever 100 minutes or 1 hour and 40 minutes, again, at the rate of 55 gpm. The relatively small example of a fixed 55 gpm flow rate depicts the water motor 10 as being capable of generating a smaller amount of work or energy on a more frequent basis, or cycle much larger amounts of work or energy on a less frequent basis or cycle, depending upon the application, e.g., work—pumping fluids, compressing gasses, or generating electric power.

A permanent load vessel in the form of reservoirs 32 and 33 is also incorporated into the system and they nearly double the falling load without increasing the flow rate. This device is designed to increase the efficiency of the work motor 10 as the force of the water weight to be temporarily retained in the reservoirs 32 and 33 is nearly doubled without increasing the flow rate into the system.

The two reservoirs 32 and 33 are located on the top of the containers 16 and 17 respectively and are independent and of equivalent or less volume than the containers 16 and 17, and are designed to allow water to flow back and forth across the top of work lever arm 28 in conduit 34 between the opposing, closed (but vented) containers 32 and 33. This is accomplished by the coupling of a permanent load within reservoirs 32 and 33. This design couples the containers 16 and 17 loads below the collar shaped reservoirs 32 and 33 which are located on top of the containers 16 and 17. Other geometric designs, other than collar shaped reservoirs, or arrangements are of course possible to accomplish the same thing.

The permanent load system provided by reservoirs 32 and 33 and the containers 16 and 17 are separate hydraulic systems, and only the vessels 16 and 17 discharge liquid, typically through their bottom drains 18 and 19.

The reservoirs 32 and 33 allow water which is permanently contained within the system to transfer back and forth laterally through the connecting conduit 34. Thus the reservoirs 32 and 33 allow water to flow freely back and forth between the reservoirs as the work lever arm 28 seesaws or rises and falls, thus transferring a fixed weight load with each cycle. The lowered reservoir 32 or 33 is raised, or counterbalanced, due to drainage (loss of weight) in the adjacent and lowered container 16 or 17 and flow containment (weight gain) in the opposite and raised container 16 or 17. As the lever arm 28 approaches the horizontal, the permanent load vessels (32 and 33) begin transferring flow (weight), which will rapidly transfer through 34 from the rising, initially lower reservoir 32 or 33 to the following, initially raised and empty reservoir and remain there until the next cycle. Consequently, the force being generated by the falling container 16 or 17 is nearly doubled without doubling the flow rate.

Water Motor Operation

As previously described, container 16 or 17 is filled with water from the tipping lever arm 11 and the flow direction and discharge are activated by buoyant force as the vessel 16 and 17 reach capacity. To better understand how the water motor 10 operates, a brief description of a complete cycle follows.

Start: The container 16 or 17 and the corresponding reservoir 32 or 33 are filled with equivalent volumes of water and positioned at the lowered end of the work lever arm 28, thus providing a resistive force. The tipping lever arm 11 is then positioned to direct flow into the raised end of the container 16 or 17, and represents the increasing effort to raise the lowered end of work lever arm 28.

Step 1: As the raised container 16 or 17 begins to fill with water, the lowered container simultaneously begins to drain or discharge water (and weight load) at a rate equivalent or greater than the rate entering the raised vessel 16 or 17.

Step 2: As the weight of the lowered container 16 or 17 is discharged, the raised container begins to approach the weight or load or the lowered reservoir 32 or 33. Thus, the raised container 16 or 17 is filled and the lowered container 16 or 17 is emptied, the lowered reservoir 32 or 33 and the raised containers 16 and 17 become of equivalent weight, and thus, the raised container 16 or 17 is lowered and the previously lowered reservoir 32 or 33 is raised.

Step 3: As the previously lowered reservoir 32 or 33 is raised, water from this reservoir begins to transfer weight (or flow) to the previously raised and now empty reservoir 32 or 33. As the work lever 28 reaches or passes through the balanced or horizontal position, the water weight or load is transferring through the connecting conduit 34 and will be equal in both of reservoirs 32 and 33 for an instant (as water continues to enter the container 16 or 17 as it is lowered). This transfer of water load is accelerated and completed as the previously raised end is lowered.

This complete transfer of permanent water weight increases the rate of loading (potential energy) on the effort side of the lever arm 28, and thus, removes, or transfers, all resistant loads to the effort load or force that is descending. Similar to the analogy of a child's seesaw, such that one child would jump off, in this case, the rising child quickly slides over the lever or seesaw and joins the playmate on the other side, the descending side.

It is through this transfer of nearly equivalent water weight that the force generated by the container 16 or 17 is nearly doubled due to the reservoirs 32 and 33. This approach allows the flow rate to be approximately half of what would be required for a specified weight load if this device were not used. Furthermore, the reservoirs 32 and 33 can be nearly equivalent in volume or load, but never greater than the containers 16 and 17, since the raised containers 16 or 17 must be able to counterbalance or raise it enough to balance the work lever arm 28 and allow the lowered reservoir 32 or 33 water weight to transfer to the receiving or effort side of the seesaw.

Finally, the rate at which the transfer of water weight to the reservoir 32 or 33 occurs is a function of the flow rate into the raised container 16 or 17 from the tipping lever arm 11 and the discharge rate out of the lowered container 16 or 17. Furthermore, in order to maximize the work being done or power generated by the lever forces, all containment vessels (16 or 17 and 32 or 33) should be positioned at the end of the work lever arm 28. This configuration also allows for the interior of the container 16 or 17 to discharge through drain 18 or 19 and the outer reservoir 32 or 33 to transfer flow (weight) through conduit 34 which connects opposite reservoirs 32 and 33. It is important to note that the reservoir 32 or 33 discharge point and connecting conduit 34 must be positioned on top of the lever arm 28 to facilitate the complete transfer of water or load by gravity. This is analogous to carrying a cake pan of water and tilting it back and forth. The height of the reservoir 32 or 33 must also be equal to or less than the elevation of the lowered tipping lever arm 11 discharge into container 16 or 17. Finally, it is important to note that the reservoir 32 and 33 must be vented to the atmosphere in order to prevent problems associated with the creation of a vacuum.

The primary principal of operation of the water motor of the present invention is utilization of recurring buoyant forces (which are created due to the designed temporary capture and release of falling liquids) to act upon the tipping tee lever in a predictable manner fundamentally based on design flow rate. Another key principal of operation is the placement weight containment vessels [16, 17, 32, 33] on the working lever (simple machine) and the manner in which water weight is managed to flow through the motor to generate energy that can be harvested by some additional means of converting the stored potential energy to kinetic energy (e.g., turn shaft, piston pump, compressor).

Finally, it is the relatively negligible buoyant force that provides the means to generate much larger gravity forces (falling water weight) or energy that can be subsequently harnessed.

I claim:

1. A water motor comprising:
    a tubular tipping lever arm having opposed open ends, a central water fill port and a central fulcrum pivotally supporting said lever arm for seesaw tipping thereabout;
    a container positioned under each open end of said lever arm to receive water flowing from a respective one of said open ends;
    a drain valve in each container for respectively draining water from said containers;
    flexible pull lines of predetermined length respectively connected between said lever arm ends and said drain valves for opening said drain valves when a respective one of said lever arm ends is in an up position;
    a float positioned in each of said containers and each float having an upwardly extending rigid lifting rod of predetermined length for engaging respective of said opposed lever arm ends and thereby cyclically reversing the seesaw tipping, and thereby flow direction, of said lever arm and resultant draining of a respective of said containers with the buoyancy force of said floats.

2. The water motor of claim 1, wherein said containers are mounted to opposite ends of a work lever arm having a central fulcrum supporting said work lever arm for seesaw rocking thereabout; and a work load connected to said rocking work lever arm for performing work generated from said rocking work lever.

3. The water motor of claim 2, including a pair of closed, vented, water reservoirs respectively secured to said containers with a conduit interconnecting said reservoirs for permitting flow transfer of water from one reservoir to the other in a cyclic manner as said work lever arm rocks.

4. The water motor of claim 3, wherein said reservoirs are mounted respectively on the tops of said containers and shaped in the form of a collar.

5. The water motor of claim 1, wherein the open ends of said tubular lever arm are provided with bottom dam walls.

6. The water motor of claim 1, said tubular tipping lever arm having a downwardly depending reservoir positioned under said lever arm central fulcrum as a counterweight.

* * * * *